G. C. HOWARD.
Tool-Handle.
No. { 126 / 1,230. }
Reissued Oct. 22, 1861.
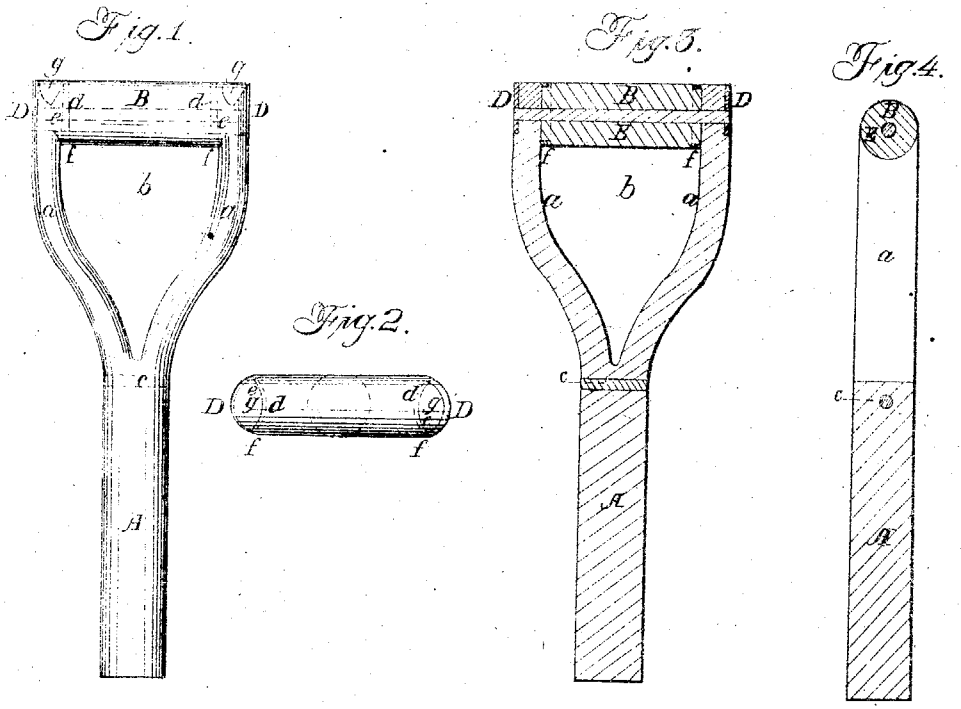

UNITED STATES PATENT OFFICE.

A. V. BLANCHARD, J. D. BLANCHARD, AND F. BLANCHARD, OF PALMER, MASSACHUSETTS, ASSIGNEES OF G. C. HOWARD.

IMPROVEMENT IN SPADE, SHOVEL, OR DUNG-FORK HANDLES.

Specification forming part of Letters Patent No. 17,837, dated July 21, 1857; Reissue No. 1,230, dated October 22, 1861.

*To all whom it may concern:*

Be it known that we, A. V. BLANCHARD, J. D. BLANCHARD, and F. BLANCHARD, all of Palmer, in the county of Hampden and State of Massachusetts, sole assignees of G. C. HOWARD, of Hardwick, in the county of Worcester and State aforesaid, do hereby declare that the said G. C. HOWARD did invent an Improved Manufacture of Shovel, Spade, or Dung-Fork Handle; and we, for the purpose of obtaining a reissue of the Letters Patent granted to said HOWARD for said invention, do hereby declare that the following is a full, clear, and exact description of the same, reference being had to the annexed drawings, forming part of this specification, in which—

Figure 1 is a side view of the invention; Fig. 2, a top view of the same; Fig. 3, a longitudinal section taken through both of the arms of the eye, and Fig. 4, a transverse section taken in a line with the axis of the holder.

Similar letters of reference indicate corresponding parts in the several figures.

This invention is designed to supersede the ordinary mode of forming the eye and holder of the handle by economizing in stock and rendering the handle more durable than those of usual construction.

In carrying out this invention a bar, A, of wood, of the kind used for such purposes, is sawed or split longitudinally about six inches at its outer end, or the end designed for the eye and holder. After the bar is thus sawed, it is properly steamed, and the two parts *a a* of the bar, formed by the kerf or split, are bent so as to form a fork, as clearly shown in Figs. 1 and 3, the space *b* between said parts *a a* being the eye of the handle. In order to prevent the bar A from spliting farther during the operation of bending the parts or arms *a a*, the bar A may have a rivet, *c*, passed through and fixed into it previous to the bending operation, such rivet being arranged as shown in Fig. 3. These forked parts or arms *a a* are next to be applied to the holder B, which may be done as follows: Each end of the holder B is formed with a concave or angular recess, *d*, to receive a corresponding convex or angular projection, *e*, made on the inner end of the adjacent arm *a*. The whole is next to be screwed together by metallic caps D D, and a rod, E, extending through the holder, the arms, and the caps and riveted down upon the latter. These caps are formed so as to extend partially and horizontally around the arms, and in the drawings each of them is shown as united to a metallic annulus, *f*, which receives the end of the holder and prevents it from becoming split or cracked open. The annulus is also made with a concavity or recess, *g*, both above and below the cap, and for the reception of the convexity of the arm, this serving as an addition to the bearing for the arms, while the ring and cap so embrace the arm as to prevent it from being split by the riveted rod E.

This mode of making a shovel or spade handle is far preferable to that where the whole handle and eye or head are cut from one piece of board equal in width to the width of the head of the handle, for in the latter case the parts or arms *a a*, and also holder B, are liable to split, owing to the direction of the grain of the wood, and the latter or old mode of construction is attended with a considerable waste of timber.

By this method of making the handle a piece of wood that would be necessarily used in the old plan for making one handle only will make three or four handles, and therefore that which would be otherwise wasted by the old plan of making the handle is saved by this method.

Having thus described the invention, what we claim as new, and desire to secure by Letters Patent, is—

A handle for shovels and similar or analogous implements having its eye *b* and holder B formed by splitting or sawing longitudinally for a suitable distance the end of the bar A, and then bending the parts or arms *a a*, formed by the split or kerf, in the form of a fork, and securing the holder B in any suitable way between the parts or arms *a a*, whereby a new and improved article of manufacture is obtained for the purpose specified.

A. V. BLANCHARD.
J. D. BLANCHARD.
FRANKLIN BLANCHARD.

Witnesses:
GEO. P. BLANCHARD,
JAMES LAIRD.